US011150935B2

(12) United States Patent
Barnes et al.

(10) Patent No.: US 11,150,935 B2
(45) Date of Patent: Oct. 19, 2021

(54) CONTAINER-BASED APPLICATIONS

(71) Applicant: International Business Machines Corporation, Armonk, NY (US)

(72) Inventors: Andrew Paul Barnes, Greystones (IE); Clea Anne Zolotow, Key West, FL (US); Oliver Raff, Stuttgart (DE); Christopher Peter Baker, East Sussex (GB); Mihai Criveti, Blanchardstown (IE)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 16/503,879

(22) Filed: Jul. 5, 2019

(65) Prior Publication Data
US 2021/0004253 A1 Jan. 7, 2021

(51) Int. Cl.
*G06F 9/455* (2018.01)
*G06F 9/50* (2006.01)
*G06F 11/34* (2006.01)

(52) U.S. Cl.
CPC ........ *G06F 9/45558* (2013.01); *G06F 9/5072* (2013.01); *G06F 11/3466* (2013.01); *G06F 2009/45591* (2013.01)

(58) Field of Classification Search
CPC ............... G06F 9/45558; G06F 9/5072; G06F 11/3466; G06F 2009/45591
See application file for complete search history.

(56) References Cited

U.S. PATENT DOCUMENTS

| 10,268,514 B1* | 4/2019 | Kesarwani ............ G06F 9/5011 |
| 2014/0181896 A1 | 6/2014 | Yablokov et al. |
| 2018/0183858 A1 | 6/2018 | Long et al. |

(Continued)

FOREIGN PATENT DOCUMENTS

| CN | 106776005 A | 5/2017 |
| CN | 107733678 A | 2/2018 |
| EP | 33965431 A | 10/2018 |

OTHER PUBLICATIONS

Abrahamsson, A., "Using Function as a Service for Dynamic Application Scaling in the Cloud," https://www.diva-portal.org/smash/get/diva2:1193394/FULLTEXT01.pdf, Uppsala Universitet, UPTEC F 18006, Mar. 2018, 40 pgs.

(Continued)

*Primary Examiner* — Dong U Kim
(74) *Attorney, Agent, or Firm* — Peter K. Suchecki

(57) ABSTRACT

Provided is a method, computer program product, and system for adjusting a container-based application. A processor may receive one or more function calls at a container-based application. The processor may process the one or more function calls using the container-based application. The processor may obtain performance data from the container-based application based on the processing of the one or more function calls. The processor may analyze the performance data against a performance measure limit. The processor may adjust an aspect of the container-based application based on the analysis of the performance data. The aspect may be one or more selected from the group consisting of a resource and a functionality of the contain-based application.

12 Claims, 5 Drawing Sheets

(56) References Cited

U.S. PATENT DOCUMENTS

2018/0329692 A1 11/2018 Kimura et al.
2020/0104189 A1* 4/2020 Gopalan ............... G06F 9/5088

OTHER PUBLICATIONS

Cole, A., "Multiple Approaches to Container Scalability," http://www.itbusinessedge.com/blogs/infrastructure/multiple-approaches-to-container-scalability.html, Posted Sep. 16, 2015, printed May 30, 2019, 1 pg.

Kundu, et al., "Modeling Virtualized Applications using Machine Learning Techniques," VEE '12, Mar. 3-4, 2012, London, England, UK, ©2012 ACM 978-1-403-1175—May 12, 2003, 12 pgs.

Matsunaga et al., "On the use of machine learning to predict the time and resources consumed by applications," homepages.cs.ncl.ac.uk/paolo.missier/doc/Matsunaga10.pdf, 2010 10th IEEE/ACM International Conference on Cluster, Cloud and Grid Computing, ©2010 IEE, pp. 495-504.

Mell et al., "The NIST Definition of Cloud Computing," Recommendations of the National Institute of Standards and Technology, U.S. Department of Commerce, Special Publication 800-145, Sep., 2011, 7 pgs.

Scivisum, "Maximising Black Friday ecommerce site performance," Checklist: Final steps for Black Friday preparation, www.scivisum.co.uk/wp-content/uploads/2016/09/scivisum-black-friday-preparation-checklist-3.pdf, printed May 30, 2019, 13 pgs.

United States Patent and Trademark Office, "Patent Full-Text Databases," http://patft.uspto.gov/netahtml/PTO/index.html, printed May 30, 2019, 1 pg.

International Search Report and Written Opinion, International Application No. PCT/IB2020/056185, filed Jun. 30, 2020, 9 pgs.

* cited by examiner

CONTAINER-BASED APPLICATIONS

BACKGROUND

The present disclosure relates to container-based applications, and more particularly to adjusting a container-based application.

By design, cloud native applications, such as container-based applications, are designed to grow and consume system resources based on increased workload/demand. While this scalability is desirable under many conditions, it is not desirable for the service to become unavailable as a result of system constraints being met. For example, an application may reach a scale limit, which may be a hard limit (relating to hardware capabilities) or a soft limit (relating to resource allocation for an application), wherein adding additional computing power will no longer allow the application to process additional incoming requests. In other words, at this point the application can no longer scale up to meet demand. In this case, typical applications queue any new requests to be processed at a later time when a processing resource becomes available, thereby increasing the latency of the system.

SUMMARY

Embodiments of the present disclosure provide a method, computer program product, and system for adjusting a container-based application. A processor may receive one or more function calls at a container-based application. A processor may process the one or more function calls using the container-based application. The processor may obtain performance data from the container-based application based on the processing of the one or more function calls. The processor may analyze the performance data against a performance measure limit. The processor may adjust an aspect of the container-based application based on the analysis of the performance data. The aspect may be one or more selected from the group consisting of a resource and a functionality of the contain-based application.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
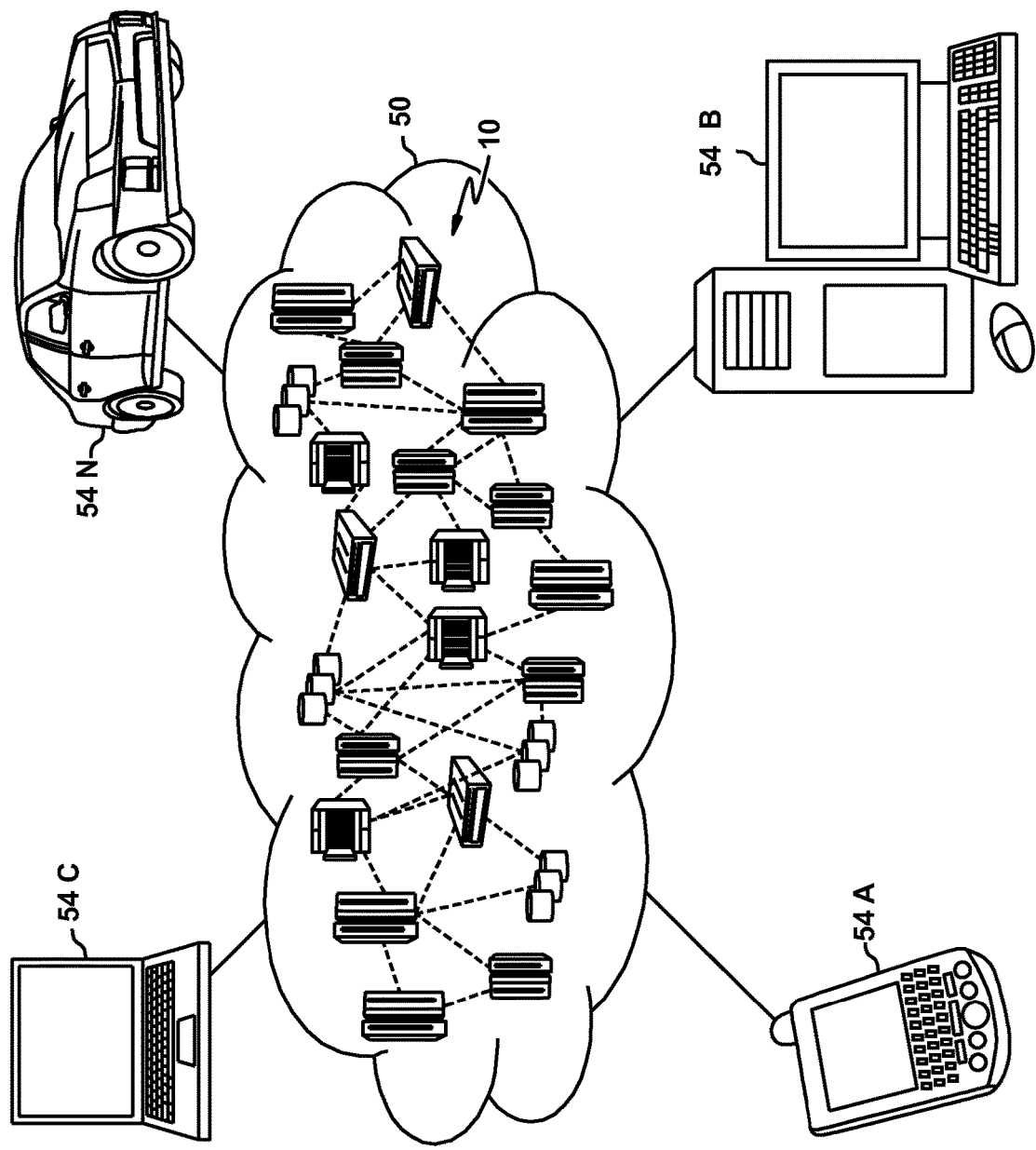
FIG. 1 depicts a cloud computing environment according to an embodiment of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

It should be understood that the figures are merely schematic and are not drawn to scale. It should also be understood that the same reference numerals are used throughout the figures to indicate the same or similar parts.

In the context of the present application, where embodiments of the present disclosure constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (processing) system may be a single device or a collection of distributed devices that are adapted to execute one or more embodiments of the methods of the present disclosure. For instance, a system may be a personal computer (PC), a server or a collection of PCs and/or servers connected via a network such as a local area network, the Internet and so on to cooperatively execute at least one embodiment of the methods of the present disclosure.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

The illustrative embodiments provide concepts for adjusting a container-based application, and more specifically adjusting a resource or functionality of the container-based application. The concept may include: receiving one or more function calls at the container-based application; processing the one or more function calls using the container-based application; obtaining performance data from the container-based application based on the processing of the one or more function calls; analyzing the performance data against a performance measure limit; and adjusting a resource and/or functionality of the container-based application based on the analysis of the performance data.

Embodiments include a concept for adjusting a container-based application in response to a comparison between the obtained performance data and a predefined performance measure limit. The assessment of the performance measure limit may be based on an analysis of performance data obtained from the container-based application when a function call is processed.

Embodiments may enable a container-based application to receive one or more function calls, and adjust a functionality or resource of the application by analyzing a set of performance data obtained from the application when processing the function calls. The functionality or resource may be adjusted when it is determined that a performance measure limit is reached or when it is determined that a performance measure will be reached within a predetermined time period.

In this way, the disclosure may provide a means of adjusting a container-based application in response to a comparison between performance data and a performance measure limit.

For example, when a measure of the performance of the application exceeds a given limit, such as time taken to process a function call exceeding a time limit, a resource or functionality of the application may be adjusted. Similarly, when a measure of the performance of the application indicates that the performance will exceed a given limit within a given time period, a resource or functionality of the application may be adjusted. In typical container-based applications, any adjustment of the application parameters is typically determined before the application begins to run, meaning that typical container-based applications are not able to dynamically adjust their behavior, for example, in response to an unexpectedly heavy processing load. In some cases, the problem cannot be solved by simply allocating more computing power to process the function calls.

Thus, by analyzing the performance of the application, a performance measure may be used to adjust the functionality or resources of the application to allow further function calls to be processed that would otherwise be queued and cause latency.

The container-based application may thus dynamically obtain and analyze performance data relating to the processing of received function calls, and adjust a functionality or resource of the container-based application accordingly.

Embodiments may provide for adjusting a resource or functionality of a container-based application based on the analysis of performance data obtained from the container-based application.

Containers are packages that rely of virtual isolation to deploy and run applications that access a shared operating system kernel without the need for virtual machines. A container-based application refers to any software application that may be run on a system that uses containers.

In an embodiment, analyzing the performance data against the performance measure limit comprises: determining whether the performance measure limit has been reached; or determining whether the performance measure limit will be reached within a given time period. In this way, the container-based application may be dynamically adjusted according to current or predicted demand.

In an embodiment, analyzing the performance data comprises: determining a processing time for processing the one or more function calls; and identifying a knee-of-the-curve based on the analyzed performance data, wherein the knee-of-the-curve is identified if the processing time exceeds a predetermined threshold. The knee-of-the-curve may be used to identify a sharp increase in a performance measure. In this case, the knee-of-the-curve may be used to identify a sharp increase in the time taken to process a function call (e.g., a sharp increase in latency).

The knee-of-the curve may be identified from a knee-of-the-curve feature within the performance data, for example, within the performance data as plotted as a graph of two variables, such as the number of function calls and the time to process each function call. The knee-of-the-curve feature may be identified as any change, such as the point at which an increase or decrease in a given variable occurs.

For example, the time taken to process a function call may increase when a given number of function calls are received. The point in this relationship at which the increase occurs may be identified as a knee-of-the-curve feature. In a specific example, the point at which the increase occurs may only be identified as a knee-of-the-curve feature if it is determined that the increase is an exponential increase. The same may be true for decreases in a given variable of the performance data. In other words, the knee-of-the-curve may be identified by way of a knee-of-the-curve feature, which indicates a change in a variable of the performance data. In this way, the knee-of-the-curve may be identified based on a change in a relationship between variables of the performance data.

In an embodiment, the performance measure limit comprises one or more of: a scalability limit, wherein the scalability limit comprises one or more of: a physical resource limit; a virtual resource limit; a container resource limit; and a predefined scaling limit; a cost limit; a responsivity limit; a CPU utilization per execution; a CPU utilization for a container; a memory utilization; a network throughput; a network latency; a storage throughput; a storage latency; a request response time; a number of transactions per second (or other agreed time period); and a failure rate. In this way, a variety of performance measure limits may be employed according to implementation of the container-based application.

In an embodiment, the resource comprises one or more of: a computing resource; and an execution architecture resource. In this way, the adjusted resource may take a form appropriate to the given scenario.

In an embodiment, the execution architecture resource comprises one or more of: a Software as a Service architecture; and a Function as a Service architecture. In this way, the application may utilize readily available execution architectures.

In an embodiment, the functionality comprises a front-end functionality, the front-end functionality comprising one or more of: an amount of data displayed; a number of permitted complex transactions; and a number of available application options. In this way, the front-end functionality may be adjusted in a number of ways according to the implementation of the application.

In an embodiment, the functionality comprises a back-end functionality, wherein the back-end functionality comprises one or more of: a number of synthetic transactions; an amount of logging; a number of synchronous transactions; and a number of asynchronous transactions. In this way, the back-end functionality may be adjusted in a number of ways according to the implementation of the application.

In an embodiment, adjusting the functionality of the container-based application comprises performing a back-end function using a front-end functionality. In this way, the back-end functionality may be preserved for increased back-end performance.

Modifications and additional steps to a traditional container-based application may also be proposed which may enhance the value and utility of the proposed concepts.

Figure 2:
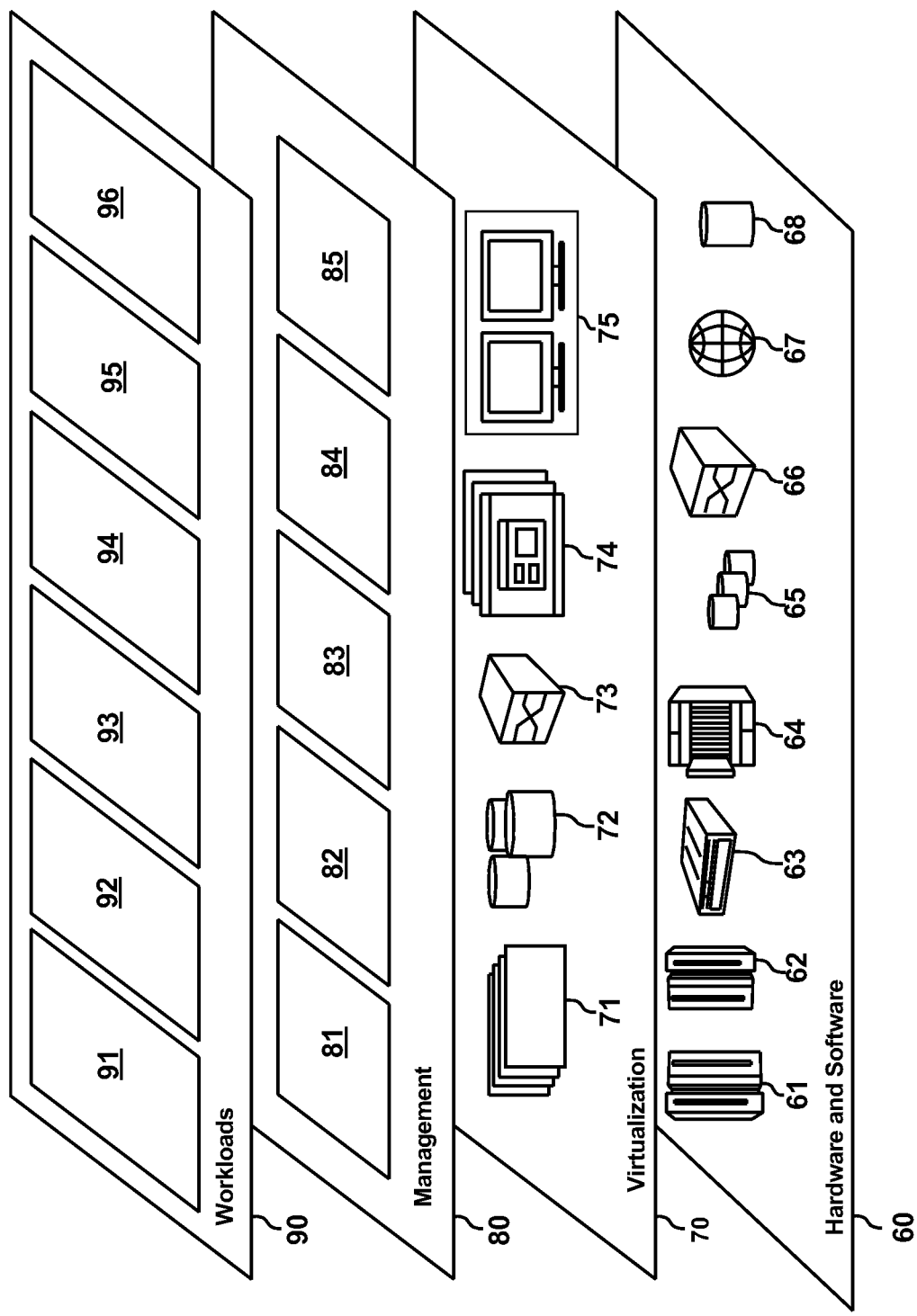
FIG. 2 depicts abstraction model layers according to an embodiment of the present disclosure.

Illustrative embodiments may be utilized in many different types of data processing environments. In order to provide a context for the description of elements and functionality of the illustrative embodiments, FIG. 1 and FIG. 2 are provided hereafter as example environments in which aspects of the illustrative embodiments may be implemented. It should be appreciated that FIG. 1 and FIG. 2 are only examples and are not intended to assert or imply any limitation with regard to the environments in which aspects or embodiments of the present disclosure may be implemented. Many modifications to the depicted environments may be made without departing from the spirit and scope of the present disclosure.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and any other suitable function 96.

In an embodiment, a method for managing a container-based application may be deployed in the management layer 80.

Figure 3:
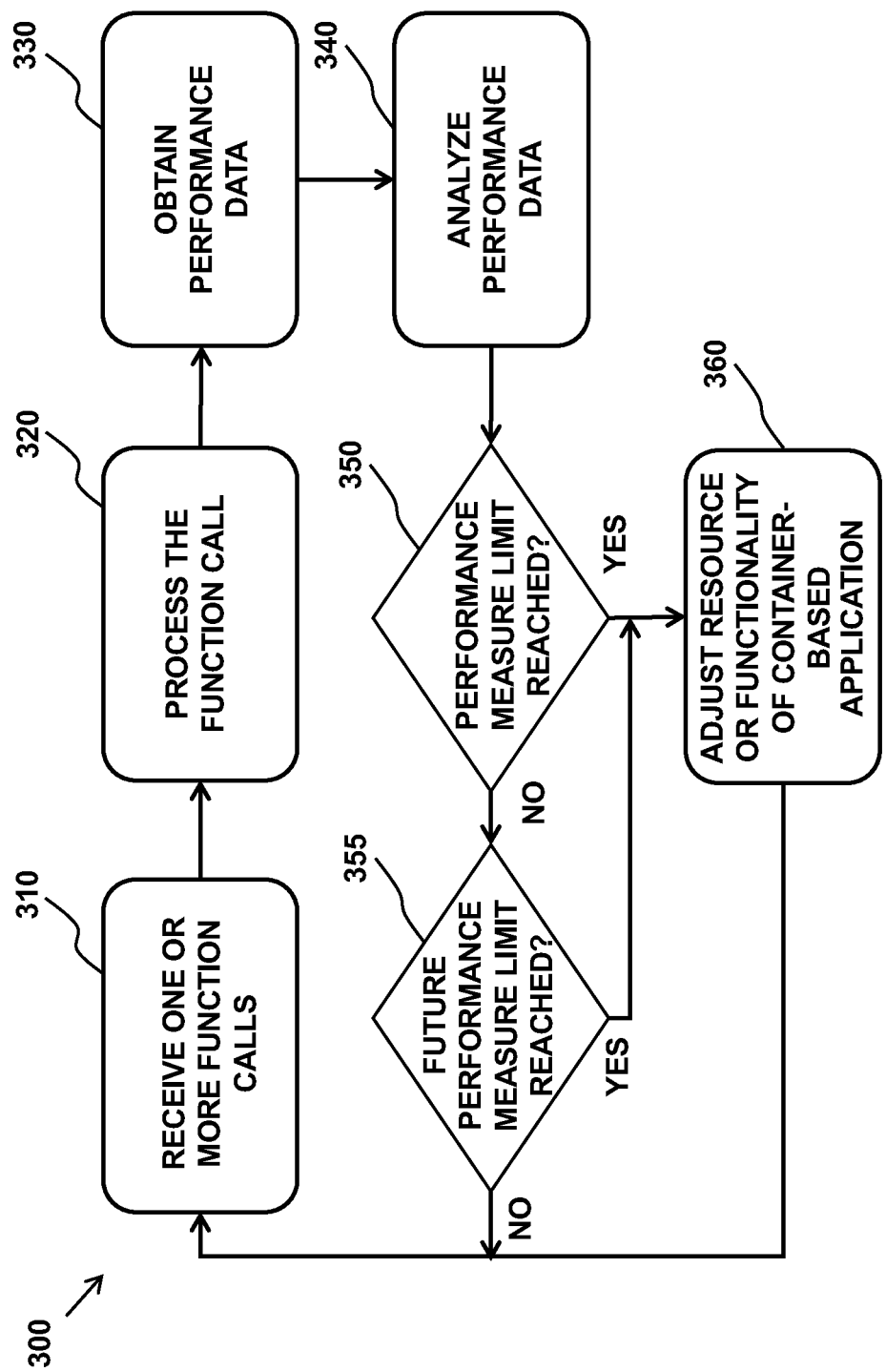
FIG. 3 illustrates a flow diagram of an example process for adjusting container-based applications, in accordance with embodiments of the present disclosure.

Referring now to FIG. 3, shown is a flow diagram of an example process 300 for adjusting container based applications, in accordance with embodiments of the present disclosure. The process 300 begins at step 310, wherein one or more function calls are received at the container-based application.

At step 320, the received one or more function calls are processed by the container-based application. The container-based application may, for example, be deployed in a cloud-based environment, such as cloud computing environment 50 detailed in FIG. 1 and FIG. 2.

Typically, applications deployed in containers are designed to be scalable up to predefined resources of the given environment. These resources may be physical, virtual, or artificial. Once these resources are exhausted, additional function calls are queued to be processed, which adds to the latency of the application.

At step 330, performance data is obtained from the container-based application based on the processing of the one or more function calls.

The containers of a container-based application are typically managed by placing them on worker nodes, the combination of which may be referred to as a pod, and management software is employed to manage these pods. Usually, the management software does not provide tracing, logging, or metrics relating to the pods. However, there are various tools that do perform this function, often referred to as a service mesh, which deploy a side-car into each pod. Such a tool may be employed to obtain the performance data from each container. It should be noted that this is server-less monitoring as far as the container is concerned for the majority of the functions.

For example, the performance data may be obtained from the Linux® address space running the container-based application. Linux is a registered trademark of Linus Torvalds in the United States, other countries, or both.

At step 340, the performance data is analyzed against a performance measure limit.

The analysis of the performance data may include determining a processing time for processing the one or more function calls and identifying a knee-of-the-curve based on the analyzed performance data, wherein the knee-of-the-curve is identified if the processing time exceeds a predetermined threshold.

By analyzing the performance data, it is possible to identify when the container-based application has scaled out to, for example, a maximum hardware potential. This may, for example, be performed by utilizing the knee-of-the-curve of the performance data. This technique is elaborated further below with reference to FIG. 4.

In addition to using hardware potential as a performance measure limit, it may also be possible to determine when a maximum cost limit, the cost being related to the financial cost of running the container-based application in a given processing environment, has been reached. In this case, the resource may be an execution architecture resource and may be adjusted to utilize an alternative environment (for example, adjusting from a Software As A Service (SAAS) architecture to a Function As A Service (FAAS) architecture).

In embodiments, the process 300 may progress to step 350 where it is determined whether the performance measure limit has been reached based on the analysis of the performance data. The performance measure limit may be any measurable limit that indicates a change in the performance of the container-based application.

By way of example, the performance measure limit may be a scalability limit, which is a performance measure limit that relates to the conventional ability of such application to scale to meet increases in processing demands. In this way, when a scalability limit is reached, the container-based application can no longer scale to meet workload demand.

An example of a scalability limit may be a physical resource limit. A physical resource limit may be related to the physical limits of the underlying physical infrastructure of the system executing the container-based application, for example the physical limits of a server hosting a cloud processing environment. A physical limit may, for example, relate to the CPU of the underlying architecture, the memory of the underlying architecture, the disk of the underlying architecture, the network of the underlying architecture, and the like.

A further example of a scalability limit may be a virtual resource limit, wherein a virtual resource limit may, for example, relate to a limit of a virtual machine (VM) on which the container-based application, or some aspect of the container-based application, may run. A virtual limit may, for example, relate to the CPU allotment of the VM, the allocated memory of the VM, the disk allocation of the VM, the network of the VM, and the like.

Another example of a scalability limit may be a container resource limit, which may be similar to limits described above with reference to the virtual resource limits. A container resource limit relates to a limitation of an individual container, which may, for example, relate to the CPU allotment of the container, the allocated memory of the container, the disk allocation of the container, the network of the container, and the like.

A further example of a scalability limit may be a predefined scaling limit, wherein a predefined scaling limit may be a limitation relating to a desired level of resource consumption by the container-based application, rather than a limit defined by a maximum hardware (virtual or otherwise) capability. Such a predefined scaling limit may be designed to restrict the amount of resources that an application may consume, for example, to avoid unexpected costs.

As described further below with reference to FIG. 4, the scalability limit may be assessed by identifying a knee-of-the-curve from the performance data obtained from the container-based application.

A further example of a performance measure limit may, as stated above, be a cost limit. For example, there may be a cost associated with the amount of resources of a processing system consumed for the processing of the received function calls. If this cost exceeds a given amount, a functionality or resource of the container-based application may be adjusted in order to maintain the cost of running the application at a given amount.

A further example of a performance measure limit may be a responsivity limit, which relates to the amount of time taken to process a given function call. For example, if a function call processing time exceeds a given amount, e.g., the application becomes unresponsive to new function calls, a resource or functionality may be adjusted to improve the responsivity of the container-based application.

The responsivity limit may be reached, for example, as a result of a scalability limit also being reached. In other words, when a scalability limit is reached, the application may not scale up to meet the processing demand, so additional function calls may be queued, thereby reducing the responsivity of the application. Alternatively, there may be a failure of an automatic scaling/provisioning process to provide additional containers to respond to increased workload demands, thereby resulting in a responsivity limit being reached before the scalability limit.

A performance measure limit may also relate to the overall utilization of the underlying physical computing resources and/or virtual machine resources that run the container(s) themselves (i.e. data that is not typically exposed to the container). While the container may not see the specific detail of the outside resources or resource utilization as part of the performance data, the container may recognize an inability to meet the incoming workload (e.g., due to resource exhaustion or a performance measure limit being reached).

Each of the limits discussed above, and any other limit suitable for monitoring the performance of an application, may be monitored by analyzing and evaluating performance data to automatically adjust the capability and/or features provided by an application service to maximize availability and, for example, the number of concurrent requests that can be processed within a dynamic, but limited, pool of processing capacity, cost factors, and knee-of-the-curve limitations.

Further, the limits described above may be used in any combination with each other in order to adjust a resource/functionality of the container-based application.

In embodiments, the analysis and evaluation of the performance data may be performed by way of a cognitive engine. The cognitive engine may take known characteristics of the wider computing platform into account. Such detail is not normally exposed to a container and may include such resources as physical host resource usage, workload of other containers, or other virtual machines.

Further, the cognitive engine may consider workload optimization characteristics of the container to predict if a performance measure limit might be hit, or has been hit, due to historical workload characteristics. For example, an application may be known to double in resource requirements on the second Sunday of every month between 2 am and 7 am.

The cognitive engine may then forecast a utilization of the container in question. For example, if a client has only purchased N amount of resources for a month, and running the application with all features enabled would only last until the $23^{rd}$ of the month, rather than the service being unavailable completely when the resource allocation is exhausted, the cognitive engine may investigate the projected availability if the functionality of the application were to be reduced. In a specific example, the cognitive engine may determine whether a banking application could last until the end of the month (for example, extending the resources for an additional week) if the displaying of active balances was no longer done automatically and rather required a user input to be displayed.

Various rules can be applied to the performance data for the determination of the adjustment of the resources/functionality of an application, such as scaling and performance. The results of the determinations, and the impact that they have on the application availability and performance may be stored in a database.

If, at step 350, it is determined that the performance measure limit has been reached, the process 300 progresses to step 360. At step 360, a resource or functionality of the container-based application is adjusted based on the analysis of the performance data.

The adjusted resource may include a computing resource used by the container-based application. A computing resource may, for example, include a CPU usage, a memory usage, a disk usage, a network usage, and the like.

The adjusted resource may also include an execution architecture resource, wherein the execution architecture resource may include a Software as a Service architecture and/or a Function as a Service architecture.

By their nature, built-for-cloud applications, such as the container-based application, may be agnostic of the underlying execution architecture and system resources (although, like any application, they do run on hardware). Thus, these factors may be used to perform a dynamic adjustment of the container-based application and migration from SAAS to FAAS.

The adjusted functionality may include a front-end functionality, wherein the front-end functionality may include: an amount of data displayed; a number of permitted complex transactions; and a number of available application options.

In other words, based on the determination that a performance measure limit has been reached and that a functionality of the container-based application must be reduced/removed to preserve service and maximize throughput (processing of the received function calls), different functionalities may be adjusted within the application logic.

For example, pre-loaded data may be replaced with an option for the user to explicitly request the data if needed, thereby reducing the amount of unnecessary data shown to the user. Further, the total amount of data displayed to the user may be limited (and/or pre-loaded), for example, by reducing content such as videos and/or image quality. In addition, complex transactions typically performed by the application may be removed. In a yet further example, options may be removed from menus typically available to the user, in particular options that may lead to complex transactions being performed.

The functionality may also include a back-end functionality, wherein the back-end functionality may include: a number of synthetic transactions; an amount of logging; a number of synchronous transactions; and a number of asynchronous transactions.

In this way, back-end service functionality, which includes features not exposed directly to the end-user, may be adjusted as a result of the determination of the performance measure limit being reached. For example, the container-based application may switch from synchronous to asynchronous transactions by queueing transactions for batch processing at a later time.

Further, adjusting the functionality of the container-based application may include performing a back-end function using a front-end functionality.

For example, back-end services may "call forward" to the front-end services to automatically reduce functionality and therefore preserve back-end processing capability. For example, long running overnight batch processing operations may trigger an anticipated front-end service functionality reduction via FAAS to reduce the load from online (real-time) processing.

Following step 360, the process 300 may return to step 310 and the process 300 may progress as described above. If, at step 350, it is determined that the performance measure limit has not been reached, the process 300 may progress to step 355 wherein it is determined whether the performance measure limit will be reached within a given time limit based on the analysis of the performance data.

In other words, the analysis of the performance data may indicate that the performance measure limit will be reached by the application within a given period of time. If it is determined that the performance measure limit will be reached within a predetermined amount of time, the process 300 may progress to step 360, wherein a resource and/or functionality may be adjusted to account for the predicted performance of the application. It should be noted that the methods of analyzing the performance data and the various performance measure limits described above may equally apply to determining whether a performance measure limit will be reached within a given time period.

If, at step 355, it is determined that the performance measure limit will not be reached within a given time period, the process 300 may return to step 310 and progress as described above.

In summary, the present disclosure may analyze and evaluate the performance of an application and provide for the dynamic adjustment of resources/functionality to maximize availability and the number of concurrent requests that can be processed. Put another way, the present disclosure may provide for services to limit functionality to increase available resources to circumvent knee-of-the-curve hardware issues that may be used for processing new incoming, or future incoming, end-user requests.

Figure 4:
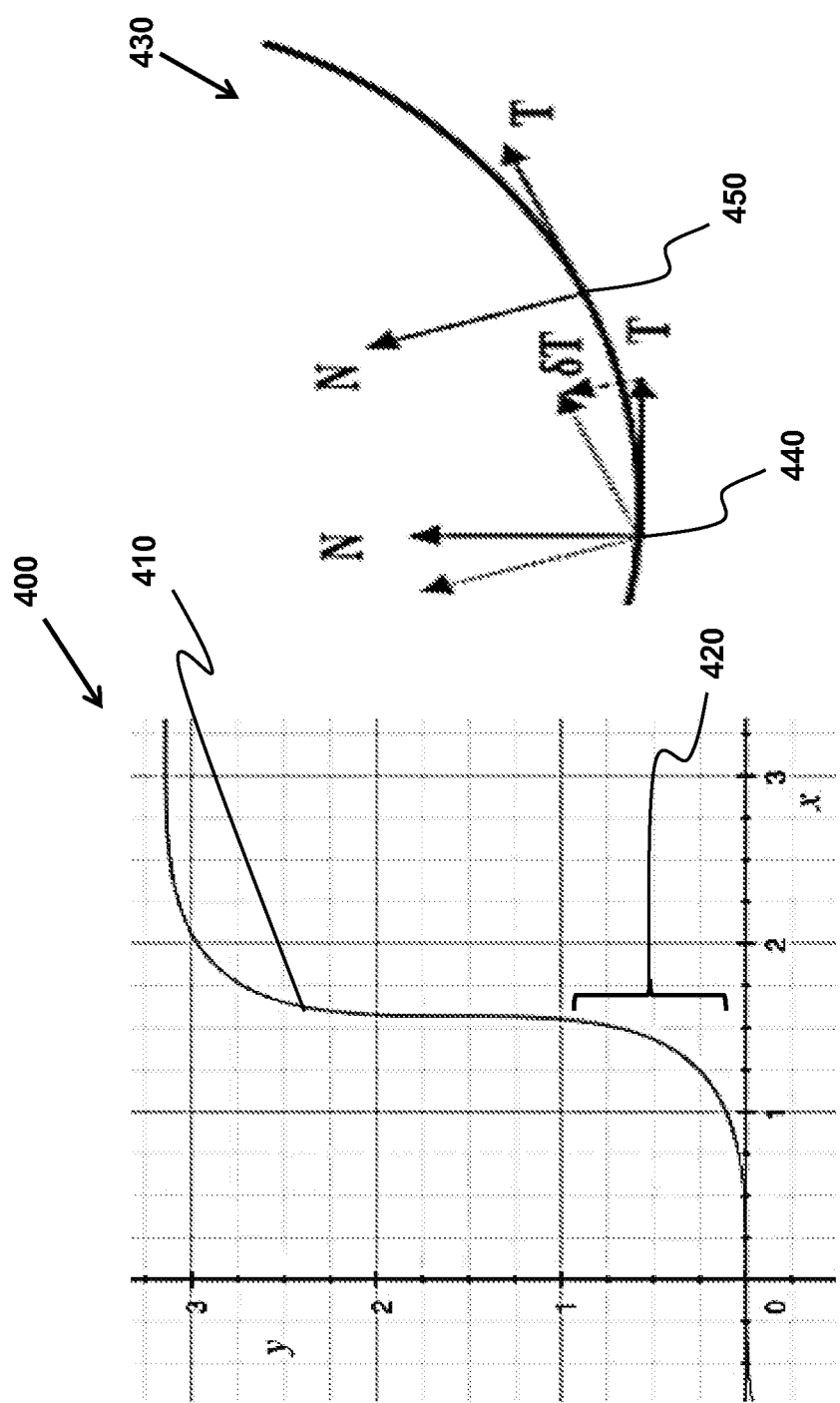
FIG. 4 depicts a graphical representation of knee-of-the-curve, in accordance with embodiments of the present disclosure.

Referring now to FIG. 4, shown is a graphical representation 400 of knee-of-the-curve, in accordance with embodiments of the present disclosure. The graph 400 is shown exhibiting a curve 410 described by the function x−y=sin (x+y) where x>0 in order to demonstrate the knee-of-the-curve principle.

In this example, the x-axis may represent the number of function calls received by the container-based application and the y-axis may represent the time taken to process a function call. In general, the x-axis may represent the demand on the application and the y-axis may represent a performance measure.

The knee-of-the-curve 420 is defined as the area of the curve where there is an exponential change. In the current example, the knee-of-the-curve is an exponential increase in the time taken to process a function call. In general, the knee-of-the-curve may be understood as the point where a performance measure limit, such as a scalability limit, of the application is reached.

Mathematically, the knee-of-the-curve may be described with reference to plot 430.

Orthogonal vectors N and T are shown for a first point 440 on the curve and a second point 450 on the curve. The vectors at the second point 450 are translated and overlaid onto the first point 440 (shown in dotted lines). The change in vector T between the first point and the second point, $\delta T$, is shown.

For computing a knee-of-the-curve feature in the performance data, $\delta T$ may be compared between three points to identify a start to an exponential CPU time, which is typically accompanied by a drop in transactional completion or even timeouts. At this time, a resource or functionality of the container-based application may be adjusted, for example by taking containers out of service and migrated to a FAAS architecture. Conversely, a flat $\delta T$ may encourage the application to induce more containers until the optimal (fluctuating) point is ascertained and executed.

It should be noted that, in the above mathematics, it's assumed that the legacy system as a whole is behaving as a serial bottleneck. The point at which $\delta T$ is determined to be at a peak is usually an exponential rise and associated with a knee-of-the-curve.

By computing a knee-of-the-curve based on the obtained performance data, a future performance of the application may be determined, thereby providing for a means of predicting when a performance measure limit may be reached within a given time period.

Figure 5:
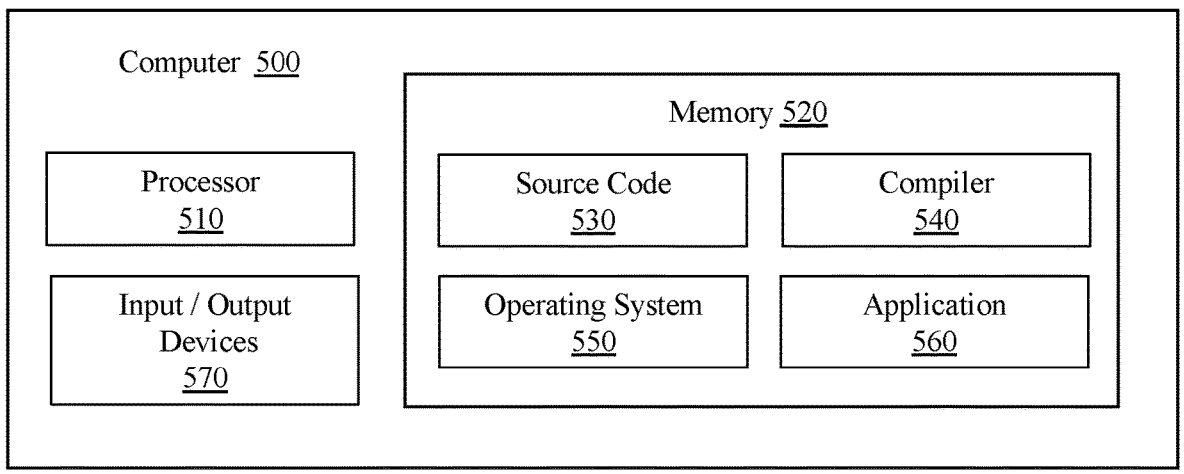
FIG. 5 illustrates a high-level block diagram of an example computer that may be used in implementing one or more of the methods, tools, and modules, and any related functions, described herein, in accordance with embodiments of the present disclosure.

Referring now to FIG. 5, shown is a high-level block diagram of an example computer 500 that may be used in implementing one or more of the methods, tools, and modules, and any related functions, described herein, in accordance with embodiments of the present disclosure. Various operations discussed above may utilize the capabilities of the computer 500. For example, one or more parts of a system for generating textual response data by analyzing the response text may be incorporated in any element, module, application, and/or component discussed herein.

The computer 500 includes, but is not limited to, PCs, workstations, laptops, PDAs, palm devices, servers, storages, and the like. Generally, in terms of hardware architecture, the computer 500 may include one or more processors 510, memory 520, and one or more I/O devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a digital signal processor (DSP), or an auxiliary processor among several processors associated with the computer 500, and the processor 510 may be a semiconductor based microprocessor (in the form of a microchip) or a microprocessor.

The memory 520 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with exemplary embodiments. As illustrated, the application 560 comprises numerous functional components for implementing the features and operations of the exemplary embodiments. The application 560 of the computer 500 may represent various applications, computational units, logic, functional units, processes, operations, virtual entities, and/or modules in accordance with exemplary embodiments, but the application 560 is not meant to be a limitation.

The operating system 550 controls the execution of other computer programs, and provides scheduling, input-output control, file and data management, memory management, and communication control and related services. It is contemplated by the inventors that the application 560 for implementing exemplary embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. The I/O devices 570 may include input devices such as, for example but not limited to, a mouse, keyboard, scanner, microphone, camera, etc. Furthermore, the I/O devices 570 may also include output devices, for example but not limited to a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

In the context of the present application, where embodiments of the present disclosure constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure provides a method for adjusting a container-based application, wherein the container-based application is adapted to process one or more function calls. Such a method includes receiving one or more function calls at the container-based application and processing the one or more function calls using the container-based application. Performance data is obtained from the container-based application based on the processing of the one or more function calls and the performance data is analyzed against a performance measure limit. A resource or functionality of the container-based application is adjusted based on the analysis of the performance data.

The present disclosure further seeks to provide a computer program product including computer program code for implementing the proposed concepts when executed on a processor.

The present disclosure yet further seeks to provide a system (such as a processing device and/or network component) adapted to execute this computer program code.

According to further embodiments of the disclosure there is herein provided a computer program product for adjusting a container-based application, wherein the container-based application is adapted to process one or more function calls, the computer program product comprising a computer readable storage medium having program instructions embodied therewith, the program instructions executable by a processing unit to cause the processing unit to perform a method comprising: receiving one or more function calls at the container-based application; processing the one or more function calls using the container-based application; obtaining performance data from the container-based application based on the processing of the one or more function calls; analyzing the performance data against a performance measure limit; and adjusting a resource and/or functionality of the container-based application based on the analysis of the performance data.

According to yet another aspect, there is provided a system for adjusting a container-based application, wherein the container-based application is adapted to process one or more function calls, the system comprising: a receiving unit adapted to receive one or more function calls; and a processing unit adapted to: process the one or more function calls using the container-based application; obtain performance data from the container-based application based on the processing of the one or more function calls; analyze the performance data against a performance measure limit; and adjust a resource and/or functionality of the container-based application based on the analysis of the performance data.

What is claimed is:

1. A computer-implemented method comprising:
   receiving one or more function calls at a container-based application;
   processing the one or more function calls using the container-based application;
   obtaining performance data from the container-based application based on the processing of the one or more function calls;
   analyzing the performance data against a performance measure limit, wherein analyzing the performance data comprises:
      determining a processing time for processing the one or more function calls;
      comparing the processing time to a predetermined threshold; and
      identifying, in response to the processing time exceeding the predetermined threshold, a knee-of-the-curve based on the analyzed performance data, wherein the knee-of-the-curve comprises an exponential change in a variable of the performance data; and
   adjusting, based on the analysis of the performance data, a front-end functionality of the contain-based application by reducing an amount of data displayed.

2. The computer-implemented method of claim 1, wherein analyzing the performance data against the performance measure limit comprises determining whether the performance measure limit has been reached.

3. The computer-implemented method of claim 1, wherein analyzing the performance data against the performance measure limit comprises determining whether the performance measure limit will be reached within a predetermined time period.

4. The computer-implemented method of claim 1, wherein the performance measure limit is selected from the group consisting of:
   a scalability limit, wherein the scalability limit is selected from the group consisting of:
      a physical resource limit;
      a virtual resource limit;
      a container resource limit; and
      a predefined scaling limit;
   a cost limit;
   a responsivity limit;
   a CPU utilization per execution;
   a CPU utilization for a container;
   a memory utilization;
   a network throughput;
   a network latency;
   a storage throughput;
   a storage latency;
   a request response time;
   a number of transactions per second; and
   a failure rate.

5. The computer-implemented method of claim 1, further comprising:
   determining, based on the performance data, a workload of the container-based application;
   correlating the workload of the container-based application with historical workload characteristics from one or more container-based applications;
   predicting, in response to the correlating, if the performance measure limit will be met based on the performance data.

6. The computer-implemented method of claim 5, comprising:
   forecasting, based on the predicting, a utilization of the container-based application.

7. A computer program product, the computer program product comprising a computer readable storage medium having program instructions embodied therewith, wherein the computer readable storage medium is not a transitory signal per se, the program instructions executable by a processor to cause the processor to perform a method comprising:
   receiving one or more function calls at a container-based application;
   processing the one or more function calls using the container-based application;
   obtaining performance data from the container-based application based on the processing of the one or more function calls;
   analyzing the performance data against a performance measure limit, wherein analyzing the performance data comprises:
      determining a processing time for processing the one or more function calls;
      comparing the processing time to a predetermined threshold; and
      identifying, in response to the processing time exceeding the predetermined threshold, a knee-of-the-curve based on the analyzed
   performance data, wherein the knee-of-the-curve comprises an exponential
   change in a variable of the performance data; and
   adjusting, based application based on the analysis of the performance data, a front-end functionality of the contain-based application reducing an amount of data displayed.

8. The computer program product of claim 7, wherein analyzing the performance data against the performance measure limit comprises:
   determining whether the performance measure limit will be reached within a predetermined time period.

9. The computer program product of claim 7, wherein the performance measure limit is selected from the group consisting of:
   a scalability limit, wherein the scalability limit is selected from the group consisting of:
      a physical resource limit;
      a virtual resource limit;
      a container resource limit; and
      a predefined scaling limit;
   a cost limit;
   a responsivity limit;
   a CPU utilization per execution;

a CPU utilization for a container;
a memory utilization;
a network throughput;
a network latency;
a storage throughput;
a storage latency;
a request response time;
a number of transactions per second; and
a failure rate.

10. A system, comprising:
a processor; and
a computer-readable storage medium communicatively coupled to the processor and storing program instructions which, when executed by the processor, cause the processor to perform a method comprising:
receiving one or more function calls at a container-based application;
processing the one or more function calls using the container-based application;
obtaining performance data from the container-based application based on the processing of the one or more function calls;
analyzing the performance data against a performance measure limit, wherein analyzing the performance data comprises:
determining a processing time for processing the one or more function calls;
comparing the processing time to a predetermined threshold; and
identifying, in response to the processing time exceeding the predetermined threshold, a knee-of-the-curve based on the analyzed performance data, wherein the knee-of-the-curve comprises an exponential change in a variable of the performance data; and
adjusting, based on the analysis of the performance data, a front-end functionality of the contain-based application by reducing an amount of data displayed.

11. The system of claim 10, wherein analyzing the performance data against the performance measure limit comprises determining whether the performance measure limit has been reached.

12. The system of claim 10, wherein analyzing the performance data against the performance measure limit comprises determining whether the performance measure limit will be reached within a given time period.

* * * * *